United States Patent
Guo et al.

(10) Patent No.: US 11,423,701 B2
(45) Date of Patent: Aug. 23, 2022

(54) GESTURE RECOGNITION METHOD AND TERMINAL DEVICE AND COMPUTER READABLE STORAGE MEDIUM USING THE SAME

(71) Applicant: UBTECH ROBOTICS CORP LTD, Shenzhen (CN)

(72) Inventors: Miaochen Guo, Shenzhen (CN); Jingtao Zhang, Shenzhen (CN); Shuping Hu, Shenzhen (CN); Dong Wang, Shenzhen (CN); Zaiwang Gu, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 4 days.

(21) Appl. No.: 17/118,578

(22) Filed: Dec. 10, 2020

(65) Prior Publication Data
US 2021/0334524 A1 Oct. 28, 2021

(30) Foreign Application Priority Data
Apr. 22, 2020 (CN) .......................... 202010320878.9

(51) Int. Cl.
*G06K 9/62* (2022.01)
*G06V 40/20* (2022.01)
(Continued)

(52) U.S. Cl.
CPC .......... *G06V 40/28* (2022.01); *G06K 9/6201* (2013.01); *G06K 9/6217* (2013.01); *G06T 5/002* (2013.01);
(Continued)

(58) Field of Classification Search
CPC ........ G06V 40/28; G06V 10/22; G06V 10/56; G06V 20/41; G06V 20/46; G06K 9/6201;
(Continued)

(56) References Cited

U.S. PATENT DOCUMENTS 11,112,875 B1 * 9/2021 Zhou ..................... G06F 3/017
2017/0131395 A1 * 5/2017 Reynolds ............... G01S 13/56
(Continued)

*Primary Examiner* — Ali Bayat

(57) ABSTRACT

The present disclosure provides a gesture recognition method as well as a terminal device and a computer-readable storage medium using the same. The method includes: obtaining a video stream collected by an image recording device in real time; performing a hand recognition on the video stream to determine static gesture information of a recognized hand in each video frame of the video stream; encoding the static gesture information in the video frames of the video stream in sequence to obtain an encoded information sequence of the recognized hands; and performing a slide detection on the encoded information sequence using a preset sliding window to determine a dynamic gesture category of each recognized hand. In this manner, static gesture recognition and dynamic gesture recognition are effectively integrated in the same process. The dynamic gesture recognition is realized through the slide detection of the sliding window without complex network calculations.

20 Claims, 7 Drawing Sheets

(51) Int. Cl.
  *G06T 7/73* (2017.01)
  *H04N 1/60* (2006.01)
  *G06T 5/00* (2006.01)
  *G06T 7/90* (2017.01)
  *G06T 7/64* (2017.01)
  *G06V 10/22* (2022.01)
  *G06V 10/56* (2022.01)
  *G06V 20/40* (2022.01)

(52) U.S. Cl.
  CPC ............... *G06T 7/64* (2017.01); *G06T 7/73* (2017.01); *G06T 7/90* (2017.01); *G06V 10/22* (2022.01); *G06V 10/56* (2022.01); *G06V 20/41* (2022.01); *G06V 20/46* (2022.01); *H04N 1/6075* (2013.01); *G06T 2207/10016* (2013.01); *G06T 2207/10024* (2013.01); *G06T 2207/20084* (2013.01)

(58) Field of Classification Search
  CPC ......... G06K 9/6217; G06T 5/002; G06T 7/64; G06T 7/73; G06T 7/90; G06T 2207/10016; G06T 2207/10024; G06T 2207/20084; H04N 1/6075; G06F 3/0304; G06F 3/0482; G06F 3/0485; G06F 3/017
  USPC ....................................................... 382/103
  See application file for complete search history.

(56) References Cited

U.S. PATENT DOCUMENTS

| | | | |
|---|---|---|---|
| 2017/0285756 A1* | 10/2017 | Wang | G06F 3/0346 |
| 2017/0323481 A1* | 11/2017 | Tran | H04N 5/23219 |
| 2018/0211104 A1* | 7/2018 | Zhao | G06T 7/246 |
| 2021/0142214 A1* | 5/2021 | Maalouf | G06K 9/6259 |

\* cited by examiner

GESTURE RECOGNITION METHOD AND TERMINAL DEVICE AND COMPUTER READABLE STORAGE MEDIUM USING THE SAME

CROSS REFERENCE TO RELATED APPLICATIONS

The present disclosure claims priority to Chinese Patent Application No. 202010320878.9, filed Apr. 22, 2020, which is hereby incorporated by reference herein as if set forth in its entirety.

BACKGROUND

1. Technical Field

The present disclosure relates to image processing technology, and particularly to a gesture recognition method as well as a terminal device and a computer storage medium using the same.

2. Description of Related Art

Gesture recognitions can be categorized into static gesture recognitions and dynamic gesture recognitions. The static gesture recognitions are for recognizing single-frame images, while the dynamic gesture recognitions are for recognizing video streams rather than single-frame images. In the prior art, deep learning method can be used to realize the dynamic gesture recognitions. For example, a spatial temporal graph convolutional network can be used to perform dynamic gesture recognition. However, deep learning methods require extremely high computing power and are not suitable for use in mobile devices with poor computing power.

BRIEF DESCRIPTION OF THE DRAWINGS

In order to more clearly illustrate the technical solutions in this embodiment, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

In order to make the objects, features and advantages of the present disclosure more obvious and easy to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the term "including" (or "comprising") indicates the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

Figure 1:
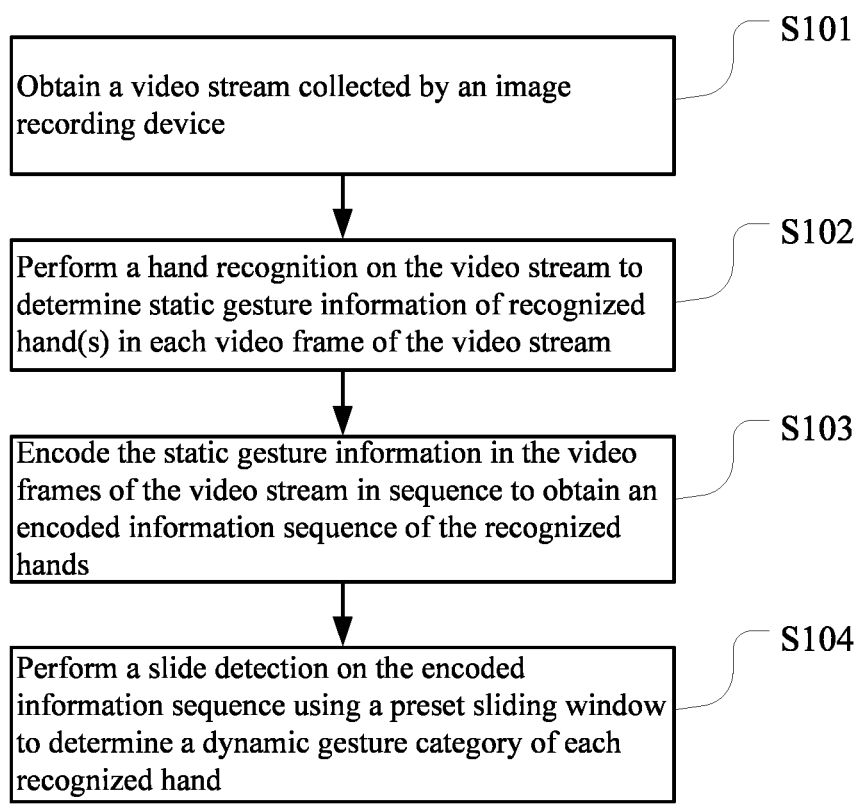
FIG. 1 is a flow chart of a gesture recognition method according to an embodiment of the present disclosure.
Figure 6:
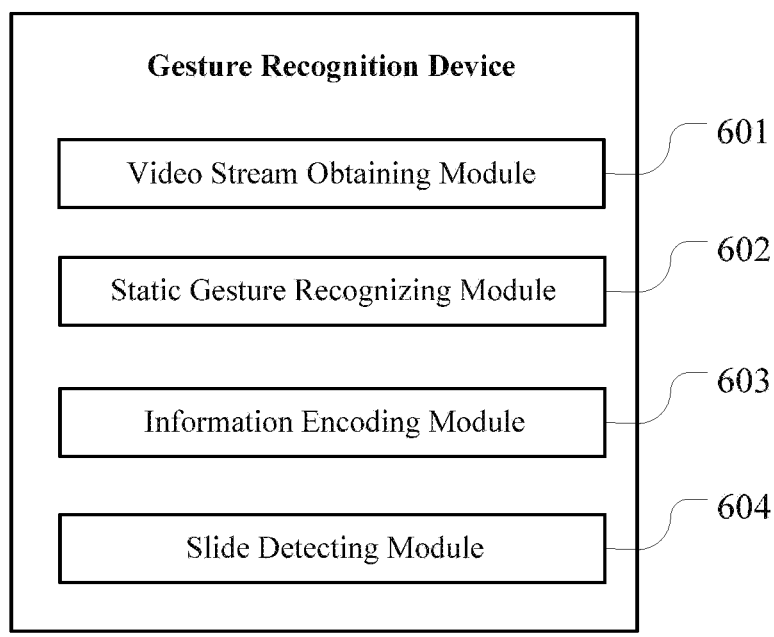
FIG. 6 is a schematic block diagram of a gesture recognition apparatus according to an embodiment of the present disclosure.
Figure 7:
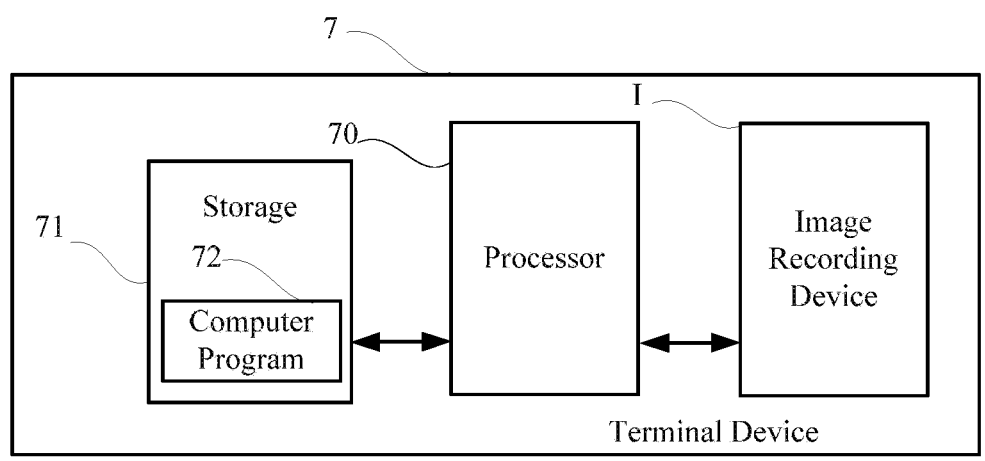
FIG. 7 is a schematic block diagram of a terminal device according to an embodiment of the present disclosure.

FIG. 1 is a flow chart of a gesture recognition method according to an embodiment of the present disclosure. In this embodiment, a gesture recognition method is provided. The method is a computer-implemented method executable for a processor, which may be implemented through a gesture recognition apparatus as shown in FIG. 6 or implemented through a terminal device as shown in FIG. 7. As shown in FIG. 1, the method includes the following steps.

S101: obtaining a video stream collected by an image recording device.

In this embodiment, the image recording device may be a single camera or a camera array composed of a plurality of cameras. According to the needs in the actual usage scenario, the image recording device can be integrated with the terminal device, or can be a peripheral device independent of the terminal device. The video stream is collected in a frame rate (e.g., 10 Hz) so that the changes of gestures can be detected in the video frames of the video stream.

In this embodiment, the raw data collected by the image recording device is in the form of RGB video stream. In which, each video frame in a RGB video stream is composed of a red channel (R), a green channel (G), and a blue channel (B).

S102: performing a hand recognition on the video stream to determine static gesture information of recognized hand(s) in each video frame of the video stream.

In this embodiment, the static gesture information may include a static gesture category and a hand centroid position of each recognized hand in the video frame.

In this embodiment, during gesture recognition, it may adopt the corresponding recognition mode for different scenes. For example, when the target (i.e., the hand to be recognized) is close to the image recording device, a short-distance recognition mode may be adopted; otherwise, and when the image recording device is far away from the image recording device, a long-distance recognition mode may be adopted. The process of gesture recognition in these two recognition modes will be described in detail below.

Figure 2:
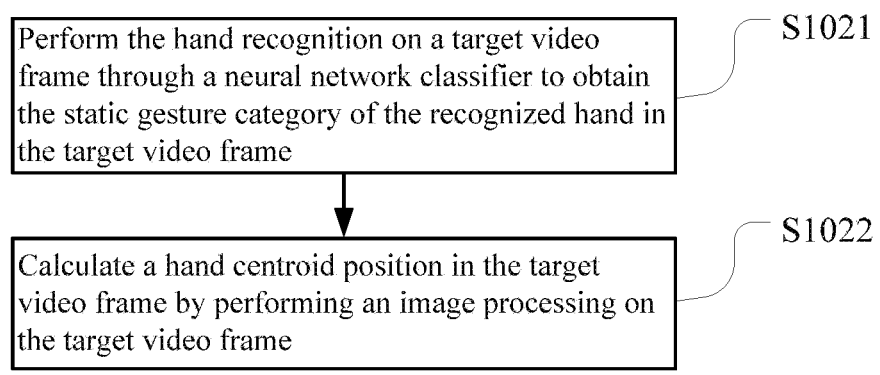
FIG. 2 is a flow chart of performing a hand recognition to determine static gesture information in a short-distance recognition mode according to the embodiment of the FIG. 1.

FIG. 2 is a flow chart of performing a hand recognition to determine static gesture information in a short-distance recognition mode according to the embodiment of the FIG. 1. Taking any video frame (referred to as a target video frame herein) of the video stream as an example, in the short-distance recognition mode, step S102 may include the following steps.

S1021: performing the hand recognition on a target video frame through a neural network classifier to obtain the static gesture category of the recognized hand(s) in the target video frame.

In the short-distance recognition mode, the recognized hand occupies a large portion of the image and is a salient target, so it can be directly input into a neural network classifier for processing.

In this embodiment, the neural network classifier includes convolutional layers and sofmax layers, where the convolutional layers are for extracting features, and the sofmax layers are for the final category regression. In this embodiment, in order to adapt to the lightweight design principle of the mobile terminal, low resolution input is adopted. For example, the size of the video frame input to the neural network classifier can be set to 224 pixels×224 pixels. In other embodiment, other size can be set according to actual needs, which is not limited herein. Furthermore, considering that the categories of static gestures are finite, they do not require too many channels in the convolutional layer. Therefore, in this embodiment, in order to further reduce the amount of calculation, the number of channels of each convolutional layer is halved. The output of the neural network classifier is the probability of each static gesture category, and the category with the largest probability can be used as the static gesture category.

S1022: calculating the hand centroid position in the target video frame by performing an image processing on the target video frame.

Figure 3:
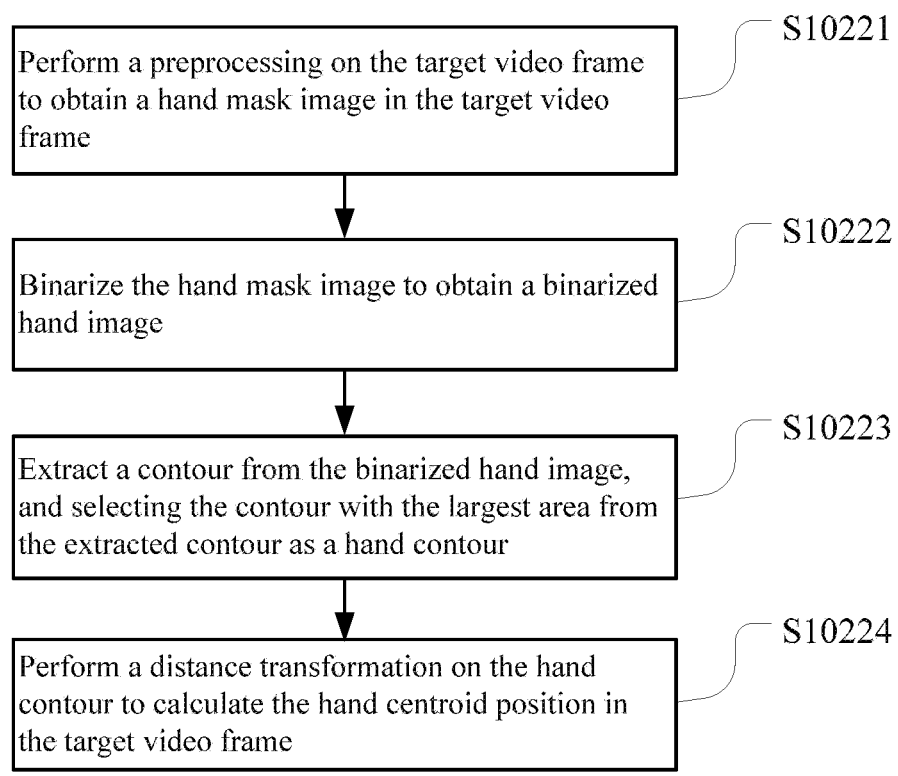
FIG. 3 is a flow chart of calculating a hand centroid position in a target video frame by performing an image processing on the target video frame according to the embodiment of the FIG. 1.

FIG. 3 is a flow chart of calculating a hand centroid position in a target video frame by performing an image processing on the target video frame according to the embodiment of the FIG. 1. As shown in FIG. 3, step S1022 may include the following steps.

S10221: performing a preprocessing on the target video frame to obtain a hand mask image in the target video frame.

Since the target video frame generally contains a messy background, it can be preprocessed to extract a hand mask image. As an example, it can smooth the target video frame using Gaussian filtering so as to obtain a smooth image. As an example, a skin color model has two color spaces of YCrCb and HSV, and the HSV color space is more suitable for the skin color of yellow people, hence it converts the smooth image from the RGB color space to the HSV color space so as to obtain a space-converted image. Then, a feature extraction is performed on the space-converted image using a preset elliptical skin color model to obtain a feature image. Finally, impurity areas in the feature image are filtered out through an opening and closing morphological operation to obtain the hand mask image.

S10222: binarizing the hand mask image to obtain a binarized hand image.

Binarization refers to converting an image into a black and white image. In this embodiment, a threshold (that is, a binarization threshold) can be determined in advance, and a pixel in the hand mask image is determined as white if it's color value is larger than the threshold, otherwise, it is determined as black.

S10223: extracting a contour from the binarized hand image, and selecting the contour with the largest area from the extracted contour as a hand contour.

Due to various possible interferences, more than one contours may be extracted. Considering that in the short-distance recognition mode, the hand occupies a large portion of the image, the contour with the largest area can be used as the hand contour.

S10224: performing a distance transformation on the hand contour to calculate the hand centroid position in the target video frame.

In this embodiment, the Euclidean distance-based distance transformation, the Manhattan distance-based distance transformation, the chessboard-distance based distance transformation, or other distance transformation algorithm can be adopted according to the actual needs to calculate the position of the centroid of the hand.

Figure 4:
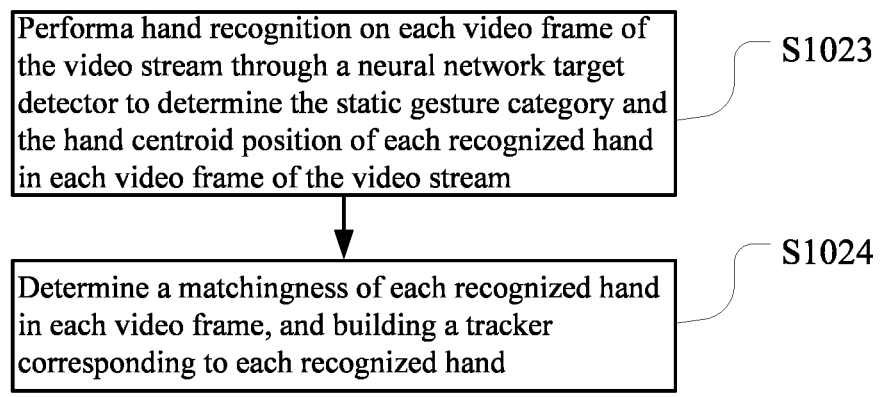
FIG. 4 is a flow chart of performing a hand recognition to determine static gesture information in a long-distance recognition mode according to the embodiment of the FIG. 1.

FIG. 4 is a flow chart of performing a hand recognition to determine static gesture information in a long-distance recognition mode according to the embodiment of the FIG. 1. As shown in FIG. 4, in the long-distance recognition mode, step S102 may include the following steps.

S1023: performing a hand recognition on each video frame of the video stream through a neural network target detector to determine the static gesture category and the hand centroid position of each recognized hand in each video frame of the video stream.

In the long-distance recognition mode, a plurality of hands are possible to appear in a video frame. Therefore, it is necessary to obtain the areas where all the hands appear in the video frame through the neural network target detector, and the neural network target detector will output a bounding box of each hand after performing non-maximum suppression (NMS) and confidence filtering, and then an image center coordinate of each detection box is calculated to take as the position of the centroid of the corresponding hand. After processing by the neural network target detector, each recognized hand has a category label to mark its static gesture category. For example, the category label of static gesture A is 1, the category label of static gesture B is 2, and the like. In particular, for the static gesture whose category cannot be determined, its category label is 0.

S1024: determining a matchingness of each recognized hand in each video frame, and building a tracker corresponding to each recognized hand.

In this embodiment, in order to determine the correspondence between the different recognized hands in each video frame, a multi-target tracking method may be used to give each recognized hand a unique identification (ID). As an example, a Kalman filter is initialized first, a predicted detection frame in the next video frame is calculated according to a hand bounding box in the current video frame using the Kalman filter, and a hand bounding box in the next video frame is determined according to the predicted detection frame, and then a Hungarian matching is performed between the hand bounding box in the current video frame and the hand bounding box in the next video frame to determine the matchingness of each recognized hand in the current video frame and the next video frame. In which, the cost matrix during the matching is composed of the Intersection over Union (IoU) of the hand bounding box in the current video frame and the hand bounding box in the next video frame. If the matched recognized hand has successfully matched in a plurality of the video frames consecutive in the video stream (the number of video frames can be set according to the actual needs, as an example, 3 video frames), the tracker corresponding to the matched recognized hand is built. Otherwise, if the matched recognized has unsuccessfully matched in a plurality of the video frames consecutive in the video stream (the number of video frames can be set according to the actual needs, as an example, 5 video frames), this recognized hand is cleared. Through this process, each hand has its own unique ID, which provides a foundation for the subsequent dynamic gesture recognition.

S103: encoding the static gesture information in the video frames of the video stream in sequence to obtain an encoded information sequence of the recognized hands.

Figure 5:
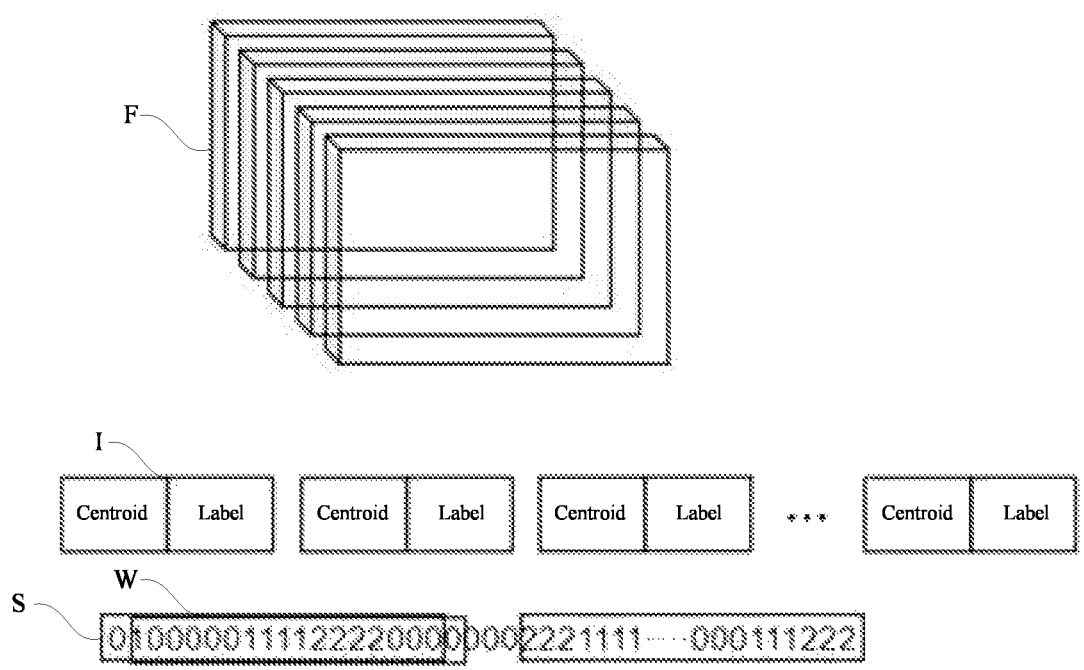
FIG. 5 is a flow chart of encoding static gesture information in the video frames of a video stream in sequence to obtain an encoded information sequence of the recognized hands according to the embodiment of the FIG. 1.

FIG. 5 is a flow chart of encoding static gesture information in the video frames of a video stream in sequence to obtain an encoded information sequence of the recognized hands according to the embodiment of the FIG. 1. As shown in FIG. 5, for any recognized hand, the static gesture information I in each video frame F in a video stream can be encoded in the form of centroid position+category label. The sequence formed by sequentially arranging the encoded information of each video frame in the video stream is the encoded information sequence S.

S104: performing a slide detection on the encoded information sequence using a preset sliding window to determine a dynamic gesture category of each recognized hand.

Dynamic gestures can be divided into hand shape change-based gestures and trajectory-based gestures. For example, the action of making a fist is a hand shape change-based gesture, and the action of waving hand is a trajectory-based gesture. The hand shape change-based gestures do not pay attention to the trajectory of hand, and can only pay attention to the key frame sequence in the video stream. In which, the key frame is the video frame whose category label is not 0, and the video frame sequence that can represent a gesture in the video stream is the key frame sequence. For example, the key frames of the action of making a fist are the key frames corresponding to the two gestures of five fingers open and fist, while the sequence cannot be changed, so the key frame sequence of this dynamic gesture is a sequence composed of the key frames corresponding to the two static gestures of five fingers open and fist. The trajectory-based gestures pay attention to both hand shape and trajectory.

In this embodiment, the width of the sliding window W (see FIG. 5) can be set according to actual needs. As an example, it can be set to 60, that is, the dynamic gesture recognition is performed in the encoded information sequence of 60 consecutive video frames each time.

As an example, a key frame in the encoded information sequence within the current sliding window can be detected, and the dynamic gesture category corresponding to the encoded information sequence is determined in response to the detected key frame meeting a preset pattern characteristic. For example, if the key frames of the gesture of five fingers open and the key frames of the gesture of fist are successively detected in the current sliding window, which conforms to the pattern characteristics of a fist, and the dynamic gesture category corresponding to the encoded information sequence is determined as making a fist. In which, if the gesture in a key frame is correctly detected in three consecutive frames and successfully tracked, the key frame is confirmed, otherwise, it is regarded as a pseudo key frame. When the last key frame of an action is confirmed, it indicates that the action is completed. Otherwise, when the first few key frames of an action are confirmed, and the following key frames have not been confirmed for a long time, the first few key frames will be cleared, and there will be no waiting indefinitely.

In one embodiment, for trajectory based gestures, a motion vector can also be calculated at a fixed interval, and the dynamic gesture category can be determined according to whether the obtained motion vector meets the characteristics of a preset motion pattern. For example, for the dynamic gesture of waving hand, the motion vector should conform to the characteristics of repeated alternating motion patterns such as continuing to the left and then continuing to the right.

Then, the sliding window is slid with one frame backward in the encoded information sequence, and it returns to the step of detecting the key frame in the encoded information sequence within the current sliding window until a gesture recognition process is terminated.

This slide detection has the advantages that, the video stream can be ensured to be completely processed without missing video frames, the encoded data is used for sliding window which has the smallest storage of key data of image frames, small memory space occupation, low computational complexity, the sliding window can effectively limit the action completion time and avoid waiting indefinitely, the video frames in the dynamic sliding window are easy to access and can be labeled according to the order in which the video frames enter, and the trajectory can be refined by, for example, calculating the motion vector at an interval of fixed frames, according to the carried centroid position information.

In summary, in this embodiment, by obtaining a video stream collected by an image recording device in real time; performing a hand recognition on the video stream to determine static gesture information of a recognized hand in each video frame of the video stream; encoding the static gesture information in the video frames of the video stream in sequence to obtain an encoded information sequence of the recognized hands; and performing a slide detection on the encoded information sequence using a preset sliding window to determine a dynamic gesture category of each recognized hand, so that static gesture recognition and dynamic gesture recognition are effectively integrated in the same process. Based on the encoded information sequence obtained by encoding the static gesture information, the dynamic gesture recognition is realized through the slide detection of the sliding window. The process is without complex network calculations, which greatly reduces the requirements for computing power, and is more suitable for use in mobile devices of low computing power.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 6 is a schematic block diagram of a gesture recognition apparatus according to an embodiment of the present disclosure. In this embodiment, a gesture recognition apparatus corresponding to the gesture recognition method described in the forgoing embodiment is provided. As shown in FIG. 6, the gesture recognition apparatus includes:

a video stream obtaining module 601 configured to obtain a video stream collected by an image recording device;

a static gesture recognizing module 602 configured to perform a hand recognition on the video stream to determine static gesture information of a recognized hand in each video frame of the video stream;

an information encoding module 603 configured to encode the static gesture information in the video frames of the video stream in sequence to obtain an encoded information sequence of the recognized hands; and a slide detecting module 604 configured to perform a slide detection on the encoded information sequence using a preset sliding window to determine a dynamic gesture category of each recognized hand.

Furthermore, the static gesture information includes a static gesture category and a hand centroid position. The static gesture recognizing module 602 may include:

a gesture category determining sub-module configured to perform the hand recognition on a target video frame through a neural network classifier to obtain the static gesture category of the recognized hand in the target video frame, in response to the hand recognition being in a short-distance recognition mode, where the target video frame is any one of the video frames of the video stream; and a centroid position calculating sub-module configured to calculate the hand centroid position in the target video frame by performing an image processing on the target video frame.

Furthermore, the centroid position calculating sub-module may include:

an image preprocessing unit configured to performing a preprocessing on the target video frame to obtain a hand mask image in the target video frame;

a binarization unit configured to binarize the hand mask image to obtain a binarized hand image;

a hand contour selecting unit configured to extract a contour from the binarized hand image, and selecting the contour with the largest area from the extracted contour as a hand contour; and a centroid position calculating unit configured to perform a distance transformation on the hand contour to calculate the hand centroid position in the target video frame.

Furthermore, the image preprocessing unit may include:

a smoothing subunit configured to smooth the target video frame using Gaussian filtering to obtain a smooth image;

a color space converting subunit configured to convert the smooth image from the RGB color space to the HSV color space to obtain a space-converted image;

a feature extraction subunit configured to perform a feature extraction on the space-converted image using a preset elliptical skin color model to obtain a feature image; and an opening and closing operation subunit configured to filter out an impurity area in the feature image through a morphological opening and closing operation to obtain the hand mask image.

Furthermore, the static gesture recognizing module 602 may further include:

a target detecting sub-module configured to perform a hand recognition on each video frame of the video stream through a neural network target detector to determine the static gesture category and the hand centroid position of each recognized hand in each video frame of the video stream, in response to the hand recognition being in a long-distance recognition mode; and a matching sub-module configured to determine a matchingness of each recognized hand in each video frame, and building a tracker corresponding to each recognized hand.

Furthermore, the matching sub-module may include:

a Kalman filter unit configured to calculate a predicted detection frame in the next video frame according to a hand bounding box in the current video frame using a Kalman filter, and determining a hand bounding box in the next video frame according to the predicted detection frame;

a matchingness determining unit configured to perform a Hungarian matching between the hand bounding box in the current video frame and the hand bounding box in the next video frame to determine the matchingness of each recognized hand in the current video frame and the next video frame; and a tracker building unit configured to build the tracker corresponding to the matched recognized hand, in response to the matched recognized hand being successfully matched in a plurality of the video frames consecutive in the video stream.

Furthermore, the slide detecting module 604 may include:

a dynamic gesture category determining sub-module configured to detect a key frame in the encoded information sequence within the current sliding window, and determining the dynamic gesture category corresponding to the encoded information sequence in response to the detected key frame meeting a preset pattern characteristic; and a sliding sub-module configured to slide the sliding window with one frame backward in the encoded information sequence, and returning to the step of detecting the key frame in the encoded information sequence within the current sliding window until a gesture recognition process is terminated.

Those skilled in the art can clearly understand that, for the convenience and conciseness of the description, the specific working processes of the above-mentioned apparatus, modules and units can refer to the corresponding processes in the foregoing method embodiments, which will not be repeated herein.

In the above-mentioned embodiments, the description of each embodiment has its focuses, and the parts which are not described or mentioned in one embodiment may refer to the related descriptions in other embodiments.

FIG. 7 is a schematic block diagram of a terminal device according to an embodiment of the present disclosure. In this embodiment, a terminal device 7 is provided. For ease of description, only a part related to this embodiment is shown.

In this embodiment, as shown in FIG. 7, the terminal device 7 includes a processor 70, a storage 71, a computer program 72 stored in the storage 71 and executable on the processor 70, and an image recording device I. When executing (instructions in) the computer program 72, the processor 70 implements the steps in the above-mentioned embodiments of the gesture recognition method, for example, steps S101-S104 shown in FIG. 1. Alternatively, when the processor 70 executes (instructions in) the computer program 72, the functions of each module/unit in the above-mentioned device embodiments, for example, the functions of the modules 701-704 shown in FIG. 7 are implemented.

Exemplarily, the computer program 72 may be divided into one or more modules/units, and the one or more modules/units are stored in the storage 71 and executed by the processor 70 to realize the present disclosure. The one or more modules/units may be a series of computer program instruction sections capable of performing a specific function, and the instruction sections are for describing the execution process of the computer program 72 in the terminal device 7.

The terminal device 7 may be a computing device such as a mobile phone, a tablet computer, a desktop computer, a notebook computer, a tablet computer, and a cloud server. It can be understood by those skilled in the art that FIG. 7 is merely an example of the terminal device 7 and does not constitute a limitation on the terminal device 7, and may include more or fewer components than those shown in the figure, or a combination of some components or different components. For example, the terminal device 7 may further include an input/output device, a network access device, a bus, and the like.

The processor 70 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 71 may be an internal storage unit of the terminal device 7, for example, a hard disk or a memory of the terminal device 7. The storage 71 may also be an external storage device of the terminal device 7, for example, a plug-in hard disk, a smart media card (SMC), a secure digital (SD) card, flash card, and the like, which is equipped on the terminal device 7. Furthermore, the storage 71 may further include both an internal storage unit and an external storage device, of the terminal device 7. The storage 71 is configured to store the computer program 72 and other programs and data required by the terminal device 7. The storage 71 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/terminal device and method may be implemented in other manners. For example, the above-mentioned apparatus/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented gesture recognition method, comprising steps of:
    obtaining a video stream collected by an image recording device;
    performing, a hand recognition on the video stream to determine static gesture information of at least a recognized hand in each video frame of the video stream, wherein the static gesture information comprises a static gesture category and a hand centroid position:
    encoding the static gesture information in the video frames of the video stream in sequence to obtain an encoded information sequence of the recognized hands, wherein the static gesture information is encoded in a form having the hand centroid position and a category label of the recognized hand; and
    performing a slide detection on the encoded information sequence using a preset sliding window to determine a dynamic gesture category of each recognized hand.

2. The method of claim 1, wherein the step of performing the hand recognition on the video stream to determine the static gesture information of the recognized hand in each video frame of the video stream comprises:
    performing the hand recognition on a target video frame through a neural network classifier to obtain the static gesture category of the recognized hand in the target video frame, in response to the hand recognition being in a short-distance recognition mode, wherein the target video frame is any one of the video frames of the video stream; and
    calculating the hand centroid position in the target vidw frame by performing an image processing on the target video frame.

3. The method of claim 2, wherein the step of calculating the hand centroid position in the target video frame by performing the image processing on the target video frame comprises:
    performing a preprocessing on the target video frame to obtain a hand mask image in the target video frame;
    binarizing the hand mask image to obtain a binarized hand image;
    extracting a contour from the binarized hand image, and selecting the contour with the largest area from the extracted contour as a hand contour; and
    performing a distance transformation on the hand contour to calculate the hand centroid position in the target video frame.

4. The method of claim 3, wherein the step of performing a preprocessing on the target video frame to obtain the hand mask image in the target video frame comprises:
    smoothing the target video frame using Gaussian filtering to obtain a smooth image;
    converting the smooth image from the RGB color space to the HSV color space to obtain a space-converted image;
    performing a feature extraction on the space-converted image using a preset elliptical skin color model to obtain a feature image; and
    filtering out an impurity area in the feature image through a morphological opening and closing operation to obtain the hand mask image.

5. The method of claim 1, wherein the step of performing the hand recognition on the video stream to determine the static gesture information of the recognized hand in each video frame of the video stream comprises:
    performing a hand recognition on each video frame of the video stream through a neural network target detector to determine the static gesture category, and the hand centroid position of each recognized hand in each video frame of the video stream, in response to the hand recognition being in a long-distance recognition mode; and
    determining a matchingness of each recognized hand in each video frame, and building a tracker corresponding to each recognized hand.

6. The method of claim 5, wherein the step of determining the matchingness of each recognized hand in each video frame, and building the tracker corresponding to each recognized hand comprises:
    calculating a predicted detection frame in the next video frame according to a hand bounding box in the current video frame using a Kalman filter, and determining a hand bounding box in the next video frame according to the predicted detection frame;
    performing a Hungarian matching between the hand bounding box in the current video frame and the hand bounding box in the next video frame to determine the matchingness of each recognized hand in the current video frame and the next video frame; and
    building the tracker corresponding to the matched recognized hand, in response to the matched recognized hand being successfully matched in a plurality of the video frames consecutive in the video stream.

7. The method of claim 1, wherein the step of performing the slide detection on the encoded information sequence using the preset sliding window to determine the dynamic gesture category of each recognized hand comprises:
    detecting a key frame in the encoded information sequence within the current sliding window, and determining the dynamic gesture category corresponding to the encoded information sequence in response to the detected key frame meeting a preset pattern characteristic; and
    sliding the sliding window with one frame backward in the encoded information sequence, and returning to the step of detecting the key frame in the encoded information sequence within the current sliding window until a gesture recognition process is terminated.

8. A terminal device, comprising:
    an image recording device;
    a memory;
    a processor; and
    one or more computer programs stored in the memory, and executable on the processor, wherein the one or more computer programs comprise:
    instructions for obtaining a video stream collected by the image recording device,
    instructions for performing a hand recognition on the video stream to determine static gesture information of at least a recognized hand in each video frame of the video stream, wherein the static gesture information comprises a static gesture category and a hand centroid position;

instructions for encoding the static gesture information in the video frames of the video stream in sequence to obtain an encoded information sequence of the recognized hands, wherein the static gesture information is encoded in a form having the hand centroid position and a category label of the recognized hand; and instructions for performing a slide detection on the encoded information sequence using a preset sliding window to determine a dynamic gesture category of each recognized hand.

9. The terminal device of claim 8, wherein the instructions for performing the hand recognition on the video stream to determine the static gesture information of the recognized hand in each video frame of the video stream comprise:

instructions for performing the hand recognition on a target video frame through a neural network classifier to obtain the static gesture category of the recognized hand in the target video frame, in response to the hand recognition being in a short-distance recognition mode, wherein the target video frame is any one of the video frames of the video stream; and instructions for calculating the hand centroid position in the target video frame by performing an image processing on the target video frame.

10. The terminal device of claim 9, wherein the instructions for calculating the hand centroid position in the target video frame by performing the image processing on the target video frame comprise:

instructions for performing a preprocessing oar the target video frame to obtain a hand mask image in the target video frame;

instructions for binarizing the hand mask image to obtain a binarized hand image;

instructions for extracting a contour from the binarized hand image, and selecting the contour with the largest area from the extracted contour as a hand contour; and instructions for performing a distance transformation on the hand contour to calculate the hand centroid position in the target video frame.

11. The terminal device of claim 10, wherein the instructions for performing a preprocessing on the target video frame to obtain the hand mask image in the target video frame comprise:

instructions for smoothing the target video frame using Gaussian filtering to obtain a smooth image;

instructions for converting the smooth image from the RGB color space to the color space to obtain a space-converted image;

instructions for performing a feature extraction on the space-converted image using preset elliptical skin color model to obtain a feature image; and instructions for filtering out an impurity area in the feature image through a morphological opening and closing operation to obtain the hand mask image.

12. The terminal device of claim 8, wherein the instructions for performing the hand recognition on the video stream to determine the static gesture information of the recognized hand in each video frame of the video stream comprise:

instructions for performing a hand recognition on each video frame of the video stream through a neural network target detector to determine the static gesture category and the hand centroid position of each recognized hand in each video frame of the video stream, in response to the hand recognition being in a long-distance recognition mode; and instructions for determining a matchingness of each recognized hand in each video frame, and building a tracker corresponding to each recognized hand.

13. The terminal device of claim 12, wherein the instructions for determining the matchingness of each recognized hand in each video frame, and building the tracker corresponding to each recognized hand comprise:

instructions for calculating a predicted detection frame in the next video frame according to a hand bounding box in the current video frame using a Kalman filter, and determining a hand bounding box in the next video frame according to the predicted detection frame;

instructions for performing a Hungarian matching between the hand bounding box in the current video frame and the hand bounding box in the next video frame to determine the matchingness of each recognized hand in the current video frame and the next video frame; and instructions for building the tracker corresponding to the matched recognized hand, in response to the matched recognized hand being successfully matched in a plurality of the video fames consecutive in the video stream.

14. The terminal device of claim 8, wherein the instructions for performing the slide detection on the encoded information sequence using the preset sliding window to determine the dynamic gesture category of each recognized hand comprise:

instructions for detecting a key frame in the encoded information sequence within the current sliding window, and determining the dynamic gesture category corresponding to the encoded information sequence in response to the detected key frame meeting a preset pattern characteristic; and instructions for sliding the sliding window with one frame backward the encoded information sequence, and returning to detect the key frame in the encoded information sequence within the current sliding, window until a gesture recognition process is terminated.

15. A non-transitory computer readable storage medium for storing one or more computer programs, wherein the one or more computer programs comprise:

instructions for obtaining a video stream collected by an image recording device;

instructions for performing a hand recognition on the video stream to determine static gesture information of at least a recognized hand in each video frame of the video stream;

instructions for encoding the static gesture information in the video frames of the video stream in sequence to obtain an encoded information sequence of the recognized hands; and instructions for performing a slide detection on the encoded information sequence using a preset sliding window to determine a dynamic gesture category of each recognized hand;

wherein the instructions for performing the slide detection on the encoded information sequence using, the preset sliding window to determine the dynamic gesture category of each recognized hand comprise:

instructions for detecting a key frame in the encoded information sequence within the current sliding window, and determining the dynamic gesture category correspondina to the encoded information sequence in response to the detected key frame meeting a preset pattern characteristic; and instructions for slid the sliding window with one frame backward in the encoded information sequence, and returning to detect the key frame in the encoded information sequence within the current sliding window until a gesture recognition process is terminated.

16. The storage medium of claim 15, wherein the static gesture information comprises a static gesture category and a hand centroid position, and the instructions for performing the hand recognition on the video stream to determine the static gesture information of the recognized hand in each video frame of the video stream comprise:

instructions for performing the hand recognition on a target video frame through a neural network classifier to obtain the static gesture category of the recognized hand in the target video frame, in response to the hand recognition being in a short-distance recognition mode, wherein the target video frame is any one of the video frames of the video stream; and instructions for calculating the hand centroid position in the target video frame by performing an image processing on the target video frame.

17. The storage medium of claim 16, wherein the instructions for calculating the hand centroid position in the target video frame by performing the image processing on the target video frame comprise:

instructions for performing a preprocessing on the target video frame to obtain a hand mask image in the target video frame:

instructions for binarizing the hand mask image to obtain a binarized hand image;

instructions for extracting a contour from the binarized hand image, and selecting the contour with the largest area from the extracted contour as a hand contour; and instructions for performing a distance transformation on the hand contour to calculate the hand centroid position in the target video frame.

18. The storage medium of claim 17, wherein the instructions for performing a preprocessing on the target video frame to obtain the hand mask image in the target video frame comprise:

instructions for smoothing the target video frame using Gaussian filtering to obtain a smooth image;

instructions for converting the smooth image from the RGB color space to the HSV color space to obtain a space-converted image;

instructions for performing a feature extraction on the space-converted image using a preset elliptical skin color model to obtain a feature image; and instructions for filtering out an impurity area in the feature image through a morphological opening and closing operation to obtain the hand mask image.

19. The storage medium of claim 15, wherein the static gesture information comprises a static gesture category and a hand centroid position, and the instructions for performing the hand recognition on the video stream to determine the static gesture information of the recognized hand in each video frame of the video stream comprise:

instructions for performing a hand recognition on each video frame of the video stream through a neural network target detector to determine the static gesture category and the hand centroid position of each recognized hand in each video frame of the video stream, in response to the hand recognition being in a long-distance recognition mode; and instructions for determining a matchingness of each recognized hand in each video frame, and building a tracker corresponding to each recognized hand.

20. The storage medium of claim 19, wherein the instructions for determining the matchingness of each recognized hand in each video frame, and building the tracker corresponding to each recognized hand comprise:

instructions for calculating a predicted detection frame in the next video frame according to a hand bounding box in the current video frame using a Kalman filter, and determining a hand bounding box in the next video frame according to the predicted detection frame;

instructions for performing a Hungarian matching between the hand bounding box in the current video frame and the hand bounding box in the next video frame to determine the matchingness of each recognized hand in the current video frame and the next video frame; and instructions for building the tracker corresponding to the matched recognized hand, in response to the matched recognized hand being successfully matched in a plurality of the video frames consecutive in the video stream.

\* \* \* \* \*